United States Patent [19]

Musgrove

[11] 4,286,761

[45] Sep. 1, 1981

[54] ECCENTRIC ACTUATOR

[75] Inventor: Robert G. Musgrove, Arlington, Tex.

[73] Assignee: Vought Corporation, Dallas, Tex.

[21] Appl. No.: 92,970

[22] Filed: Nov. 9, 1979

Related U.S. Application Data

[63] Continuation-in-part of Ser. No. 933,697, Aug. 15, 1978, abandoned.

[51] Int. Cl.³ .................... B64C 13/28; F16H 33/10
[52] U.S. Cl. .................... 244/75 R; 74/86; 74/98; 92/121; 91/210; 244/219; 244/215; 280/95 R; 310/118
[58] Field of Search ............ 244/75 R, 76 R, 213, 244/215, 216, 214, 219, 78; 92/121, 125, 122; 91/210; 74/86, 98, 804, 805; 310/118, 40.5, 115, 117, 119, 121; 280/95 R, 96

[56] References Cited

U.S. PATENT DOCUMENTS

| | | | |
|---|---|---|---|
| 1,456,433 | 5/1923 | Glasser | 74/86 |
| 2,191,872 | 2/1940 | Upton | 310/118 |
| 2,451,061 | 10/1948 | Booth | 280/96 |
| 2,486,478 | 11/1949 | Kennedy | 74/86 |
| 2,574,376 | 11/1951 | Childs et al. | 74/86 |
| 2,954,830 | 10/1960 | Gehres | 92/122 |
| 3,020,060 | 2/1962 | Rosenkrands | 280/95 R |
| 3,131,610 | 5/1964 | Paulus | 92/125 |
| 3,269,737 | 8/1966 | Freese | 92/121 |
| 3,546,957 | 12/1970 | Adams | 280/96 |
| 3,687,374 | 8/1972 | Nash | 239/265.35 |
| 3,944,170 | 3/1976 | Musgrove | 244/219 |

FOREIGN PATENT DOCUMENTS

| | | | |
|---|---|---|---|
| 480489 | 4/1953 | Italy | 310/118 |
| 817964 | 8/1959 | United Kingdom | 92/121 |

*Primary Examiner*—Galen L. Barefoot
*Attorney, Agent, or Firm*—James M. Cate

[57] ABSTRACT

An actuator (10) for effecting relative pivotal movement between two structures (12, 14) includes a bent beam member (18) having a first portion (20) rotatably secured to one structure and a second portion (22) supported for rotation and eccentric revolution by a housing (42) grounded to the other structure. Index gears (64, 66) assure eccentric revolution of the beam member (18) in an opposite direction in response to rotation of the bent beam member to produce relative pivotal movement between the beam members (20, 22). In the first two embodiments, the actuators (10, 120) incorporate internal hydraulic or electric drive arrangements. In other embodiments, the actuators (150, 172, 250, 270) employ various planetary type gear arrangements to achieve even greater mechanical advantage. In the last embodiment, both portions (304, 306) of the bent beam member (302) of the actuator (300) are driven and supported for eccentric revolution.

43 Claims, 20 Drawing Figures

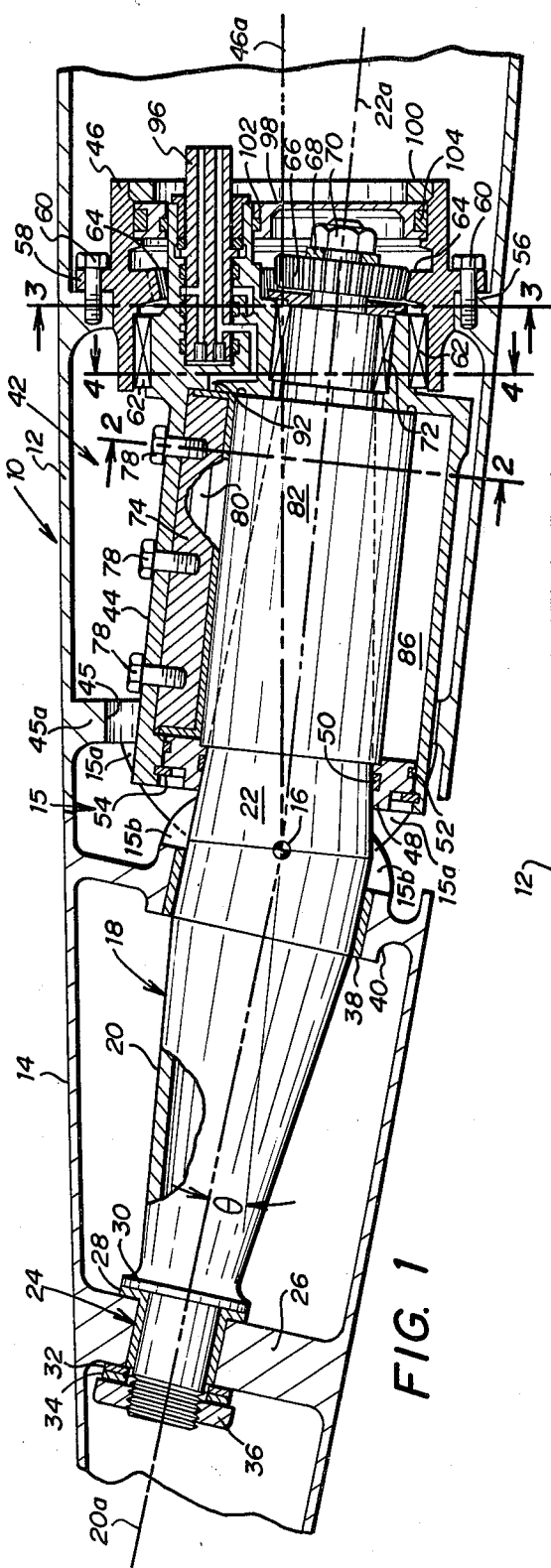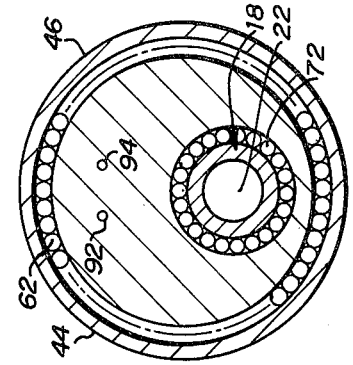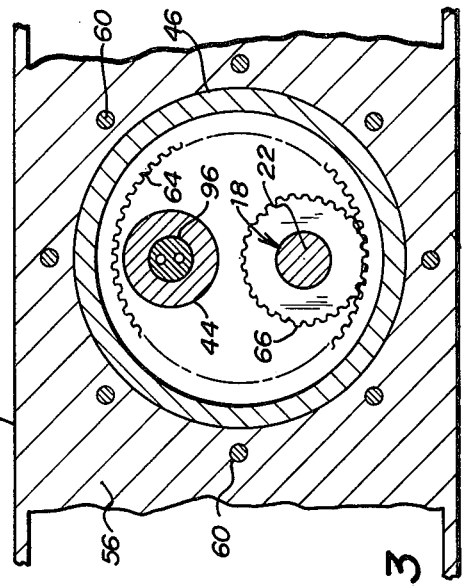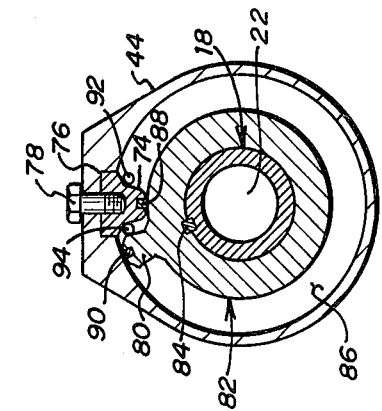

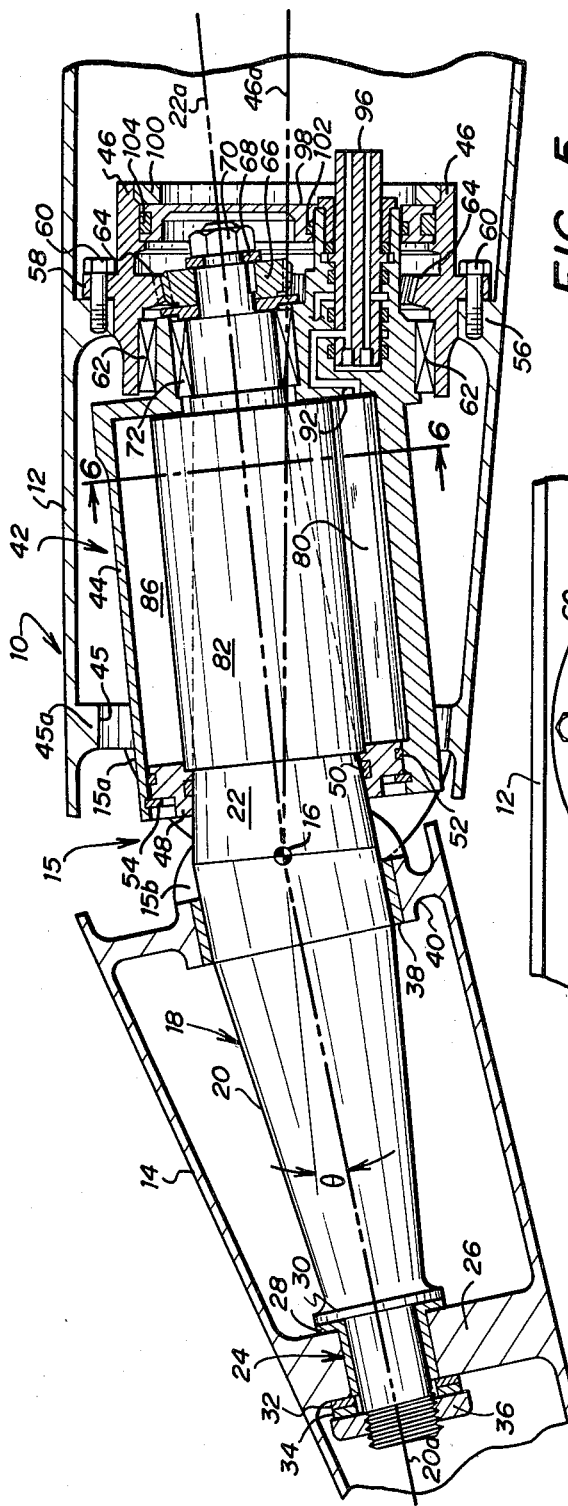
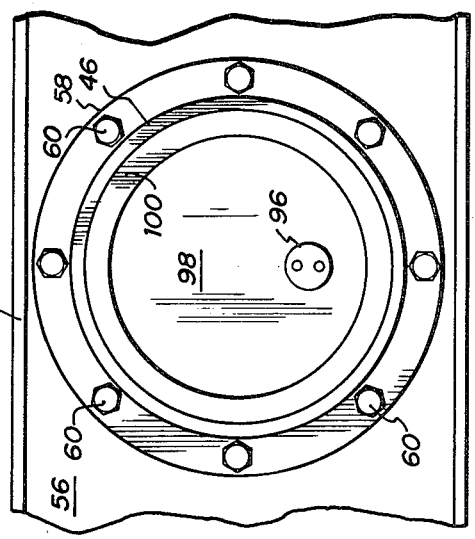
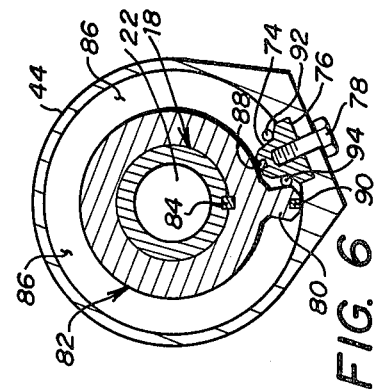
FIG. 5
FIG. 7
FIG. 6

ECCENTRIC ACTUATOR

CROSS REFERENCE TO RELATED APPLICATION

This application is a continuation-in-part of application Ser. No. 933,697 filed Aug. 15, 1978, now abandoned.

TECHNICAL FIELD

The present invention relates generally to an apparatus for producing relative pivotal movement between two structures. More particularly, this invention concerns an actuator of the rotatable, bent beam type for effecting controlled relative pivotal movement between two structures.

BACKGROUND ART

The prior art includes a variety of mechanisms which can be employed to effect relative pivotal movement between two structures. The design of such mechanisms varies in accordance with their application. In the aircraft industry, for example, the design requirements of these mechanisms are particularly stringent. Mechanisms for pivotally actuating and positioning flaps, trim devices, and other control surfaces must be capable of precisely controlled operation in the environment of complex counterforces. The in-flight loads opposing operation of aircraft control surfaces can be both severe and multidirectional. A variety of external loads must be resisted or overcome.

In addition to meeting severe structural requirements, mechanisms for actuating aircraft control surfaces are also subject to other design considerations. Reasonable standards of weight, size, power consumption, reliability, and operational precision must also be satisfied. It will be appreciated that the problems discussed so far with respect to the actuation of aircraft control surfaces are more pronounced in the case of variable camber airfoils or the like having two or more serially connected movable airfoil segments, each of which must be pivoted in a controlled manner with respect to adjacent segments.

A large part of the problem involves the fact that the length of the moment arm through which the control forces are applied is generally limited by the local thickness of the airfoil, since such actuator mechanisms are typically installed within the external profile of the airfoil to reduce drag. Since the length of a vertical moment arm is limited by the airfoil thickness, the associated gearing and drive transmission must be of greater capacity and therefore greater weight. On the other hand, while a horizontal moment arm can be of relatively greater length, its pivotal movement is also limited by the thickness of the airfoil. Once again, these difficulties become even more formidable with respect to variable camber airfoils or thin section airfoils.

In a departure from more traditional approaches, the prior art includes the teaching of a "bent beam" type mechanism in such applications. U.S. Pat. No. 3,944,170, of common inventorship and assignment herewith, teaches an apparatus for producing pivotal movement which employs a rotatable bent beam member. While the device disclosed and claimed therein operates satisfactorily, it has been found that the device can be further improved. It has been found that some of the objectives of my earlier invention can be accomplished with even more efficiency. It has been found that the same basic structure can be more efficiently driven by means of various other drive arrangements. For example, the use of an internal, integral actuator eliminates some of the typical problems associated with the gear driven transmissions of the prior art, such as weight, play, maintenance, size, expense and the like. With an integral actuator, power transmission losses are eliminated and large actuation forces can be developed in a compact envelope.

The present invention, in each of its embodiments, incorporates an indexing gear independent of the driving gear. In my prior patent, the embodiment illustrated incorporated a bevel drive gear external of the housing which itself served as an indexing gear for causing equal opposite rotational movement of the bent beam and the oppositely rotatable housing or carrier.

Accordingly, it is a primary object of the present invention to provide an improved eccentric actuator mechanism for effecting relative pivotal movement between first and second structures.

Another object is to provide an eccentric actuator apparatus capable of effecting precisely controlled, relative pivotal movement of two structures while bearing substantial loads between the structures.

Yet another object is to provide an eccentric actuator which incorporates an independent indexing means separate from the drive gear to permit utilization of various drive systems offering various advantages and efficiencies.

Another object is to provide a pivotal actuator for aircraft control surfaces compatible with airfoils of thin section and having the moment arm extending in a generally chordwise direction within the airfoil.

A further object is to provide an eccentric actuator inherently providing a substantial amount of mechanical reduction particularly at the extremes of pivotal range of the device.

A still further object is to provide an improved actuator which is particularly adapted for use in a vehicle steering system.

DISCLOSURE OF INVENTION

The present invention comprises an improvement over the particular embodiment of the eccentric actuator illustrated and described in detail in U.S. Pat. No. 3,944,170. In accordance with the broader aspects of the invention, there is provided an improved eccentric actuator mechanism for effecting relative pivotal movement between first and second structures. The improved actuator comprises a rotatable bent beam member having first and second end portions. The second end portion of the bent beam member is eccentrically supported so that a planar, arcuate output is produced at the first end of the member. An index means controls rotation and eccentric revolution of one portion of the bent beam member independent of the drive means. In two embodiments the device is actuated by an integral rotary actuator which develops the necessary power internally and without the problems associated with external drive transmissions. In other embodiments one or both ends of the bent beam member are driven by gear arrangements.

In accordance with more specific aspects of the invention, the second end portion of the bent beam member is mounted for rotation within a rotatable carrier member. The bent beam member and the carrier member are interconnected with a timing gear arrangement to provide for equal and opposite rotation. In a first embodiment, a fluid chamber is defined between the carrier member and the second end portion of the beam member. Vanes are provided in the fluid chamber which are secured to the carrier member and the bent beam member. The introduction of fluid into the chamber causes the carrier member and the bent beam member to rotate in opposite directions under the same fluid force, functioning as an efficient integral rotary actuator.

In a second embodiment, an electric motor is integrated into the device with the beam member comprising the rotor and the carrier member comprising the stator. The first two embodiments of the invention effect eccentric rotation of the beam member with forces developed internally and applied over a greater distance to produce the same power as an external drive requiring relatively larger forces.

Further embodiments of the invention utilize gear arrangements to drive the bent beam member with greater mechanical advantage. In particular, the third embodiment includes a gear arrangement with a worm and worm gear to provide a substantially irreversible drive system and relatively large gear ratios. The fourth and fifth embodiments of the invention utilize planetary gear arrangements wherein the drive gear is supported in the carrier member for rotation therewith to provide a relatively more reversible actuator with medium gear ratios. The sixth embodiment includes a straight forward gear arrangement wherein the index gear on the beam member is driven directly. Both ends of the bent beam member are driven in the eccentric actuator of the seventh embodiment.

BRIEF DESCRIPTION OF DRAWINGS

A more complete understanding of the invention can be had by reference to the following Detailed Description in conjunction with the accompanying Drawings, wherein:

FIG. 1 is a side sectional view, with certain portions broken away, of two structures with an improved eccentric actuator incorporating a first embodiment of the invention coupled therebetween;

FIG. 2 is a sectional view taken generally along lines 2—2 of FIG. 1 in the direction of the arrows;

FIG. 3 is a sectional view taken generally along lines 3—3 of FIG. 1 in the direction of the arrows;

FIG. 4 is a sectional view taken generally along lines 4—4 of FIG. 1 in the direction of the arrows:

FIG. 5 is a side sectional view similar to the first inventive embodiment of FIG. 1 but with one of the structures pivoted relative to the other structure;

FIG. 6 is a sectional view taken generally along lines 5—5 of FIG. 4 in the direction of the arrows;

FIG. 7 is an end view of the embodiment shown in FIG. 6;

DETAILED DESCRIPTION

Figure 8:
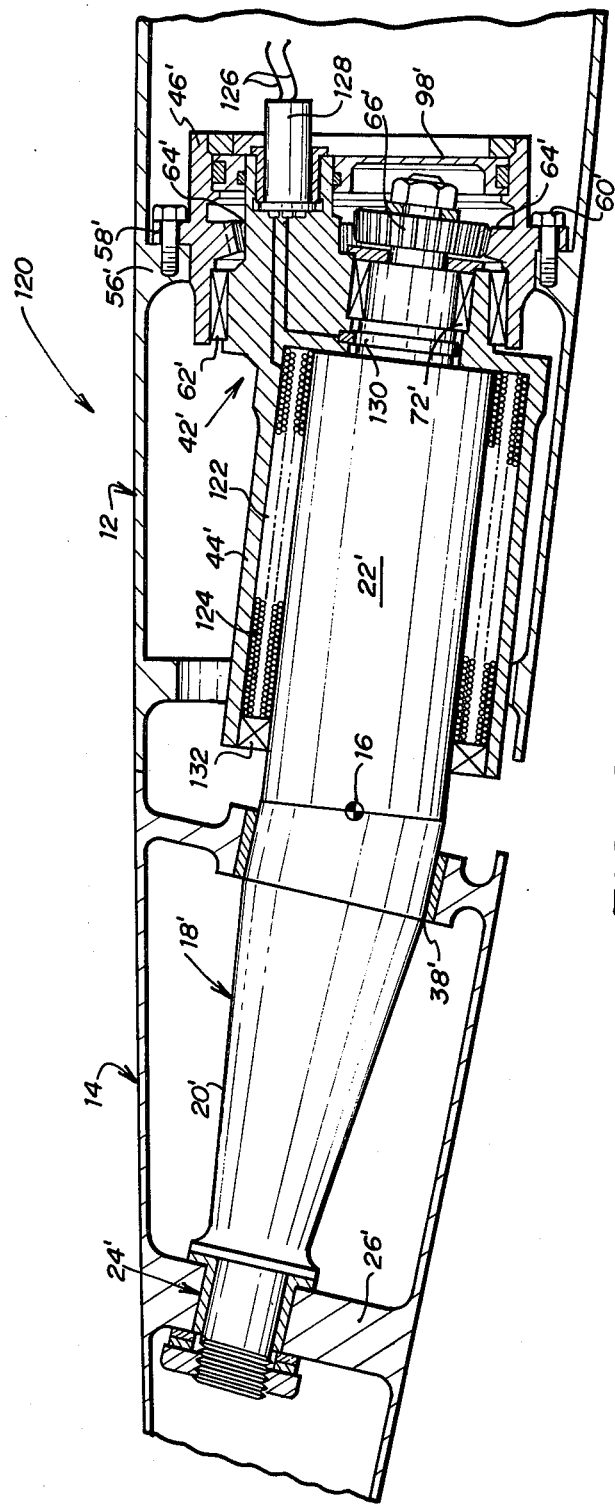
FIG. 8 is a side sectional view of two structures with an improved eccentric actuator incorporating a second embodiment of the invention coupled therebetween.

Referring now to the Drawings, wherein like reference numerals designate like or corresponding parts throughout the views, and particularly referring to FIG. 1 there is shown an eccentric actuator 10 incorporating a first embodiment of the invention. Actuator 10 is of the "bent beam" variety and comprises an improvement over the embodiment shown in U.S. Pat. No. 3,944,170, the disclosure of which is hereby incorporated by reference. As will be more fully set forth hereinafter, improved actuator 10 includes unique integral structure for fluidly effecting the eccentric movement which causes the desired pivotal output motion. Use of the improved actuator 10 reduces or eliminates some of the problems encountered with an external gear drive like that utilized in U.S. Pat. No. 3,944,170. The improved actuator 10 is more efficient in terms of power supplied, and requires less total installation space.

The actuator 10 is shown in FIG. 1 as coupled between an aircraft wing 12 and an associated flap 14. As shown, the wing 12 and the flap 14 are pivotally connected by a hinge 15 having one section 15a secured to the wing and the other section 15b secured to the flap. Selective, controlled relative pivotal movement of the flap 14 relative to the wing 12 is the purpose of the actuator 10. The flap 14 is mounted for pivotal movement relative to the wing 12 about the axis 16. The axis 16 defines a hinge line extending spanwise along the junction between adjacent flap and wing sections of an airfoil structure. In practice, one actuator 10 can be utilized to effect relative pivotal movement between adjacent structures which are otherwise hingedly supported. If desired, at least two actuators 10 can be coupled between two structures to serve the dual function of an actuator and structural hinge, as will be discussed hereinafter.

While the improved actuator 10 is illustrated and described herein with respect to the actuation of a flap or control surface of an aircraft, it will be understood that the invention can be employed in applications other than those in the aerospace industry.

The actuator 10 includes an elongated bent beam member 18 extending in a generally chordwise direction between the wing 12 and the flap 14. The elongated member 18 is preferably of hollow construction and comprises first and second portions 20 and 22 tapering outwardly toward their respective distal ends. The central axis 20a of first portion 20 is skewed from the central axis 22a of the second portion 22 of the elongated member 18 by an acute angle $\theta$. The angle $\theta$ thus corresponds to the bend angle in the member 18. Depending upon the degree of angular output desired, the angle $\theta$ can comprise any acute angle. The angle $\theta$ is illustrated as approximately 6 degrees.

The first portion 20 of the member 18 is rotatably secured to the flap 14. A first bearing 24 is provided for rotatably journaling the distal, reduced end of the first portion 20 of the member 18 within a corresponding bore formed through a first support of frame member 26 of the flap 14. The bearing 24 may comprise any suitable bearing. As shown, the first bearing 24 consists of an annular, teflon lined sleeve fitted around the distal end of the first portion 20 and seated within the bore formed through the frame member 26. The first bearing 24 includes a circumferential lip portion 28 disposed between one side of the frame member 26 and a corresponding circumferential lip portion 30 formed about the first portion 20 of the beam member 18. An annular, teflon bearing 32 surrounds the externally threaded end of the first portion 20, and is disposed between the other side of the frame member 26 and a washer 34. A nut 36 is threadedly secured about the distal end of the first portion 20 whereby the bent beam member 18 is mounted for rotation relative to the flap 14, but is constrained against axial movement relative thereto.

A second bearing 38 is similarly seated within a corresponding, annular opening formed through a second support or frame member 40 of the flap 14. The second frame member 40 is spaced apart from the first frame member 26 of the flap 14. Any suitable bearing can be employed for the second bearing 38. As illustrated, the second bearing 38 comprises an annular, teflon lined sleeve for rotatably journaling the first portion 20 of the bent beam member 18. It will thus be appreciated that the first and second bearings 24 and 38 comprise a first bearing means for permitting rotation of the bent beam member 18 about the axis 20a of the first portion 20. In addition, the first and second bearings 24 and 38 prevent yaw or pitch of the member 18 relative to the flap 14 to provide moment transfer capability between the two structures.

Teflon lined, sleeve bearings such as the bearings 24 and 38 are advantageous in the present invention because of their light weight, but other suitable bearing constructions can also be employed. For example, ball, needle or roller bearing assemblies (not shown) can also be used. In some applications of the actuator 10, the bearing elements can simply comprise smoothly finished, slidably mating surfaces provided with a lubricant.

With further reference to FIG. 1, the second portion 22 of the bent beam member 18 extends and is journaled within a housing 42 mounted within the wing 12. The housing 42 comprises a carrier 44 rotatably secured to a fixed housing support 46. The carrier 44, as shown, extends through a relatively large opening 45 formed in a frame member 45a of the wing 12. The carrier 44 is of hollow and generally cylindrical construction and surrounds the second portion 22 of the bent beam member 18.

An annular cap 48 is provided between the distal end of the carrier 44 and a medial section of the second portion 22 of the member 18. The end cap 48 is provided with annular inner and outer seals 50 and 52, respectively, to maintain sealing engagement between the member 18 and the interior of the carrier 44. Any suitable seal members can be employed for the seals 50 and 52. For example, O-ring type seals can be used for the seals 50 and 52. The end cap 48 is fastened to the carrier 44 such as by means of a snap ring 54 seated in a cooperating annular groove in the carrier as illustrated in FIG. 1. It will thus be appreciated that the end cap 48 serves as a seal between the distal end of the carrier 44 and the bent beam member 18.

The proximal end of the carrier 44 is secured to and mounted for rotation within the housing support 46. The housing support 46 extends through an associated opening formed in a support or frame member 56 of the wing 12. The frame member 56 is spaced apart from the member 45a. The housing support 46 is provided with a flange 58 which engages one side of the frame member 56. The support 46 is preferably affixed to the frame member 56 by means of bolts 60 extending through the flange 58. Of course, other suitable fasteners can be employed to secure the housing support 46 to structure within the wing 12.

The carrier 44 to journaled for rotation within the housing support 46 within an annular bearing 62. The carrier 44 thus rotates relative to the housing support 46 about an axis 46a intersecting the axis 16. While the bearing 62 is shown in schematic form in FIG. 1, it will be appreciated that any suitable type of bearing can be employed. For example, the bearing 62 can comprise bearings of the roller, needle or ball type.

A set of index gears 64 and 66 interconnects the bent beam member 18 and the carrier 44 with the housing support 46. The gear 64 is a ring type gear grounded to the support 46. The gear 66 comprises a pinion type gear secured to the distal end of the second portion 22 of the member 18. The gears 64 and 66 are in meshed engagement, as is perhaps best shown in FIG. 3. The gear 66 is affixed to the reduced and threaded end of second portion 22 of the member 18 with a washer 68 and a nut 70 and rotates with the bent beam member.

It will thus be apparent that the distal end of the second portion 22 of the beam member 18 is mounted for eccentric rotation within the gear 64 of the housing support 46. This end of the beam member 18 thus revolves eccentrically in a circle defined by the ring gear 64 whose center is coincidental with the axis 46a. The eccentricity is substantially equal to the angle $\theta$. It will also be seen that the second portion 22 of the member 18 is journaled for rotation about the axis 22a within the bearing 72 mounted within the carrier 44. The carrier 44 is rotatable both about the axis 22a of the second portion 22 of the beam member 18, and is also rotatable within the bearing 62 relative to the stationary housing support 46. The bearing 72 can comprise, for example, roller, ball, needle or any other suitable type of bearing.

Referring now to FIGS. 1 and 2, the housing 42 of the improved actuator 10 includes integral structure for effecting rotation of the bent beam member 18, as opposed to the external pinion and double crown gears arrangement of my previous invention, contained in U.S. Pat. No. 3,944,170. The carrier 44 is provided with a carrier vane 74 extending inwardly and longitudinally from the inner wall of the carrier.

In accordance with the preferred construction of the invention, the carrier 44 is provided with a generally cylindrical inner wall surface through turning, broaching, or another conventional machine operation. A smooth surface suitable for use in a fluid sealing application can thus be readily produced. After forming a cylindrical cavity within the carrier 44, a longitudinal slot 76 is cut into the inner surface of the carrier. Preferably, the carrier vane 74 is then secured within the slot 76 by bolts 78. The vane 74 is thus non-integral, and therefore simplifies the manufacture of the improved actuator 10. Such a construction eliminates the difficulties encountered heretofore in forming a vane integral with a cylindrical chamber. For example, an integral vane cannot be formed by turning with a lathe. Moreover, no forces on the non-integral vane 74 cause a moment which must be reacted either by the carrier 44 or the bolts 78. The non-integral vane 74 includes a base portion sufficiently wide so that forces caused by fluid pressure on the vane are transferred in compression through the sides of the vane base portion to the carrier 44. Stresses on the vane 74 are distributed directly to the carrier 44. Although described in reference to a cylindrical chamber, it will be appreciated that this non-integral vane construction can also be employed within other rotary actuator configurations, including tapered designs. In addition, while this is the preferred construction of the carrier 44, it will be understood that it is not critical to the practice of the invention.

A second longitudinal vane 80 is secured to and mounted for rotation with the second portion 22 of the bent beam member 18. If desired, the vane 80 can be secured directly to the member 18. However, in the preferred embodiment, the vane 80 comprises a portion of a vane sleeve 82 having a generally cylindrical outer surface and a tapered inside for receiving the second portion 22 of the beam member 18. As illustrated, the vane sleeve 82 is secured to the member 18 with a key 84, which is best shown in FIG. 2. If desired, the vane sleeve 82 can be secured to the bent beam member 18 with a pin or other fastener (not shown).

It will thus be apparent that an annular chamber 86 is defined between the carrier 44 and the vane sleeve 82. Of course, if the vane sleeve 82 is not employed, and the vane 80 is secured directly to the beam member 18, then the chamber 86 would comprise a tapered annulus. Sealing elements 88 and 90 are provided at the distal ends of the vanes 74 and 80, respectively, to maintain sealing contact with the outside surface of the vane sleeve 82 and the inside surface of the carrier 44, respectively.

A pair of ports 92 and 94 are provided in the proximal end of the carrier 44 for fluid communication with the chamber 86. As is best shown in FIG. 2, the ports 92 and 94 are provided on either side of the carrier vane 74. The distal end of the chamber 86 is, of course, sealed by the cap 48. The ports 92 and 94 are connected to fluid feed and return lines. In particular, the ports 92 and 94 are connected to a conventional swivel fitting 96 extending from the proximal end of the carrier 44. The swivel fitting 96 in turn is connected to a suitable source of fluid under pressure (not shown) via a suitable valve (not shown). The fluid employed is preferably incompressible, such as hydraulic fluid. In some applications, a compressible fluid may be satisfactory.

The improved actuator 10 operates as follows. FIG. 1 depicts the actuator 10 in a full up position wherein the skewed axes 20a and 22a are coplanar. The vanes 74 and 80 in the carrier 44 are thus initially oriented in the position shown in FIG. 2. The introduction of fluid from the port 94 with the return of fluid through the port 92 causes the vanes 74 and 80 to move away from each other. Preferably, the vanes 74 and 80 are of equal areas so that an equal force is applied to each vane. The carrier 44 and the bent beam member 18 are thus caused to rotate in opposite directions.

The index gears 64 and 66, however, control the opposite rotations of the bent beam member 18 and the carrier 44. The gear 66 is rigidly secured to the beam member 18. As the beam member 18 is rotated about the axis 22a, the distal end of the second portion 22 thereof travels within the ring gear 64 and simultaneously causes the carrier 44 to rotate within the bearing 62 of the housing support 46. Consequently, the carrier 44 is pulled at an equal rate but in an opposite direction as the end of the second portion 22 of the beam member 18 rotates in eccentric fashion within the housing support 46 to produce the desired planar output motion of the first portion 20. Thus, the use of an indexing means, which comprises the pinion indexing gear 66 and the ring gear 64, independent from any drive gear meshed with both the beam member 18 and the carrier or housing 44 as was employed in the embodiment of my prior patent, permits, in this embodiment, the use of a hydraulically powered, internally mounted drive system or means. (In the other embodiments to be described below, the indexing means permits the use of other forms of mechanical driving gears and arrangements which offer such advantages as increased efficiency, and end mounted drive shafts and gears.)

Referring to FIGS. 1 and 3, the swivel fitting 96 is sealingly received through a grease cap 98 secured to the housing support 46 by threaded retainer ring 100. The cap 98 is equipped with inner and outer annular seals 102 and 104, respectively, to maintain sealing contact with the swivel fitting 96 and the support 46. The seals 102 and 104 can comprise, for example, conventional O-rings. Since the swivel fitting 96 is anchored to the carrier 44, the cap 98 also rotates within the housing support 46. The flap 14 is thus pivoted about the axis 16 until reaching the desired deflection angle. As is extensively explained in my previous patent, U.S. Pat. No. 3,944,170, an angular range of 40 can be achieved with a bent beam type actuator.

FIGS. 5-7 illustrate the improved actuator 10 with the flap 14 in the maximum down position. The opening 45 in frame member 45 accommodates the movement of the carrier 44. If desired, a spherical bearing can be mounted in the opening 45 to support the carrier 44, eliminating the need for hinge 15. When utilizing such a bearing, the actuator 10 also functions as a structural hinge. It will be appreciated that fluidly effecting rotation of the carrier 44 and the beam member 18 with an incompressible fluid causes the actuator 10 to be extremely stiff with respect to counter-forces received from the flap 14. Operation of the actuator 10 in the opposite direction is accomplished by simply reversing the fluid flow through the chamber 86 and the ports 92 and 94.

Referring now to FIG. 8, there is shown a second embodiment of the improved actuator 120 incorporating the invention. The actuator 120 includes numerous component parts which are substantially identical in construction and function to component parts of the actuator 10, being identified by means of the same reference character with the addition of a prime (') notation.

The primary feature of the actuator 120 comprises the use of an integral electric motor, as opposed to the rotary fluid actuator of the first embodiment, for application of the rotary force to the bent beam member 18'. The actuator 120 can be used, for example, in relatively lighter duty situations. A plurality of windings or conductors 122 are secured to the carrier 44' in a circumferential arrangement with respect to the second portion 22' of the beam member 18. The conductors 122 are connected to a suitable source of power (not shown). A plurality of windings or conductors 124 are secured to the second portion 22' of the beam member 18 and rotate therewith and inside the carrier 44'. A source of power (not shown) is connected via wires 126, a swivel fitting 128, and a brush arrangement 130 to the conductors 124 mounted on the rotatable beam member 18'. As shown, the second portion 22' of the beam member 18 is of cylindrical configuration for purposes of illustration. Preferably, the carrier 44' of the actuator 120 includes an annular bearing 132 for supporting the beam member 18', instead of the end cap 48 of the actuator 10. In addition, the actuator 120 employs a similar set of index gears 64' and 66' to interconnect the beam member 18' with the housing 42'.

It will thus be apparent that conductors 122 and 124 comprise the stator and rotor, respectively, of an integral electric motor which applies the opposite rotational forces to the beam member 18' and the carrier member 44' of the actuator 120. Aside from the foregoing structural differences, the actuator 120 functions similarly to the actuator 10.

FIGS. 9–20 illustrate additional embodiments of the eccentric actuator of the present invention. As explained above, the actuator shown in my previous U.S. Pat. No. 3,944,170 utilizes an input pinion gear for driving a bevel gear mounted near the pivot axis of the bent beam member to cause opposite relative rotation between the beam member and the housing simultaneously with eccentric rotation of one end of the beam member, thereby effecting planar pivotal motion of the other end Actuators 10 and 120 herein incorporate internal hydraulic or electric drive arrangements to eliminate some of the power transmission problems associated with external gear arrangements. The embodiments illustrated in FIGS. 9–20 and described below utilize various gear arrangements to provide more simple actuators with even greater mechanical advantage than the previous embodiments.

Figure 9:
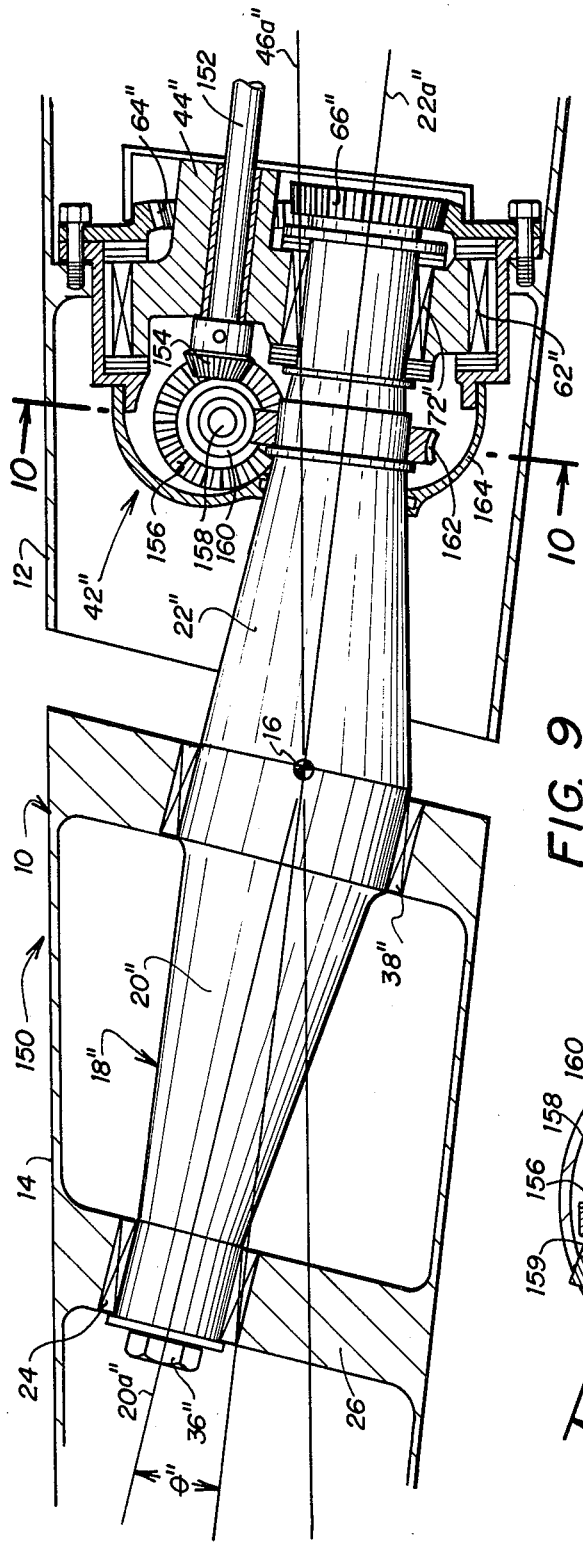
FIG. 9 is a side sectional view of two structures with an improved eccentric actuator incorporating a third embodiment of the invention coupled therebetween.
Figure 11:
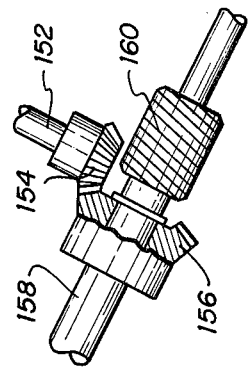
FIG. 11 is a sectional view taken generally along lines 11—11 of FIG. 9 in the direction of the arrows.
Figure 10:
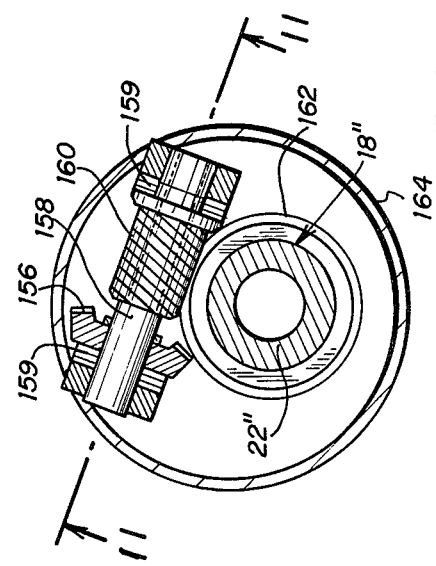
FIG. 10 is a sectional view taken generally along lines 10—10 of FIG. 9 in the direction of the arrows.

FIGS. 9–11 illustrate an improved actuator 150 incorporating a third embodiment of the invention. The actuator 150 includes numerous components which are substantially identical in construction and function to components of the actuator 10. Accordingly, such components have been identified with the same reference numeral together with a double prime (") notation.

The actuator 150 includes a bent beam member 18" extending between the wing 12 and the flap 14. The bent beam member 18" comprises first and second portions 20" and 22" tapering outwardly toward their respective distal ends. The central axis 20a" of first portion 20" is skewed from the central axis 22a" of second portion 22" by an acute angle $\theta''$, which corresponds to the bend angle in the member 18". For purposes of illustration, $\theta''$ is shown as approximately 7 degrees. The axes 20a" and 22a" intersect at the hinge line or pivot axis 16.

The first portion 20" of the bent beam member 18" is rotatably secured to flat 14 by bearings 24" and 38", but is constrained against axial movement relative thereto by a nut 36".

The second portion 22" of the bent beam member 18" is supported within the housing 42" for eccentric rotation as well as rotation about the axis 22a". The second portion 22" is journaled for rotation within carrier 44" by the bearing 72". The carrier 44" is supported by the bearing 62" for rotation within the fixed housing support 46". A gear 66" secured to the end of the second portion 22" is engaged with a ring gear 64" on the housing support 46". The center of the circle defined by the ring gear 64" is coincidental with the rotational axis 46" of the carrier 44, which axis extends through the pivot axis 16.

The primary feature of the actuator 150 comprises the use of a drive arrangement including a worm and worm gear to achieve greater gear reduction and higher irreversibility. A drive shaft 152 extends through the carrier 44". Secured to the inside end of the shaft 152 is a bevel gear 154 which is enmeshed with another gear 156 mounted on a shaft 158. The shaft is rotatably supported within the carrier 44" by bearings 159. A worm gear 160, which is also mounted on the shaft 158, is enmeshed with a gear 162 secured to the second portion 22" of the bent beam member 18". A flexible cover 164 encloses gears 154, 156, 160 and 162, and is secured to the carrier 44" for rotation therewith.

It will thus be apparent that a large amount of gear reduction can be achieved with the worm and worm gear arrangement of actuator 150 such that forces transferred from the first portion 20" to the second portion 22" of the bent beam member 18" cannot easily rotate the worm gear 160 or the shaft 152. The actuator 150 thus provides a stiff connection, which is generally desirable between movable airfoil segments. The shaft 152 can be driven by any suitable means, such as a high speed motor or the like. Aside from a different drive arrangement, the actuator 150 operates like actuator 10.

Figure 12:
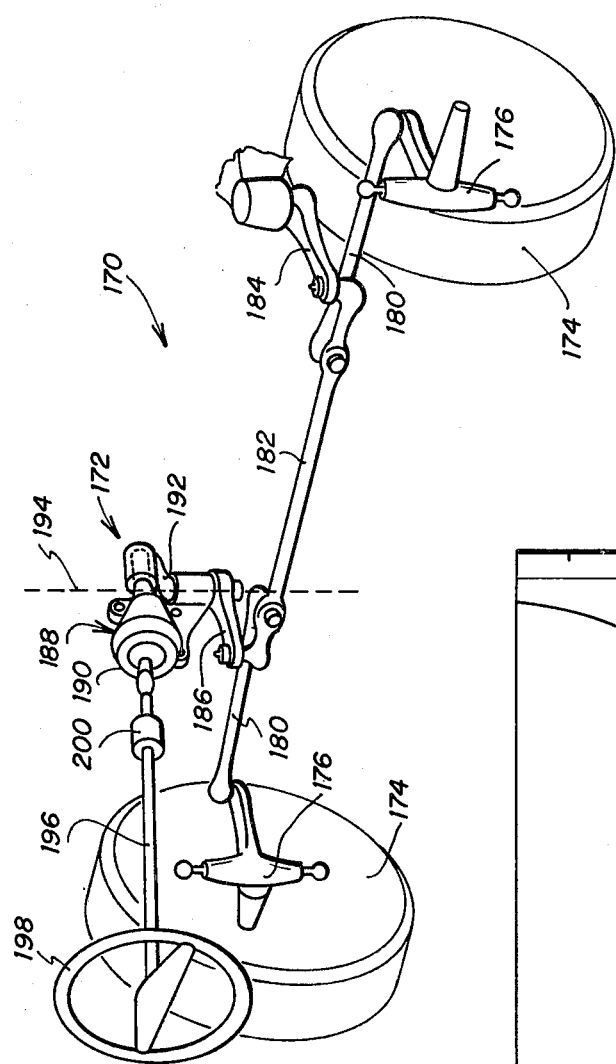
FIG. 12 is a perspective illustration of a vehicle steering system incorporating an eccentric actuator of the invention.

Referring now to FIG. 12, there is shown a vehicle steering system 170 incorporating an actuator 172 constructed according to the invention. The system 170 includes a pair of front wheels 174 which are supported by king pins 176 for pivotal movement about generally vertical, spaced apart axes. A steering arm 178 is secured to each king pin 176. The steering arms 178 are interconnected by a pair of tie rods 180 and a drag link 182. The ends of the drag link 182 are connected to an idler arm 184, which is grounded to the frame (not shown) of the vehicle, and to a pitman arm 186 which is driven by the actuator 172.

In particular, the actuator 172 includes a housing 188 comprised of a base portion 190, which is secured to the frame (not shown) of the vehicle, and an output portion 192 which is splined or otherwise secured to the pitman arm 186 and which is pivotal about the axis 194. The actuator is controlled through a steering column 196 and steering wheel 198 to steer the wheels 174.

As will be more fully explained hereinafter, the actuator 172 offers greater mechanical advantage and efficiency than the steering actuators of the prior art, and particularly at the pivotal extremes of range where the forces of parking or maneuvering a vehicle in close quarters are especially high. Due to the efficiency of the actuator 172, it may be desirable to incorporate into the steering system 170 a damper 200 to suppress shock loads induced in the system from the wheels 174.

Figure 13:
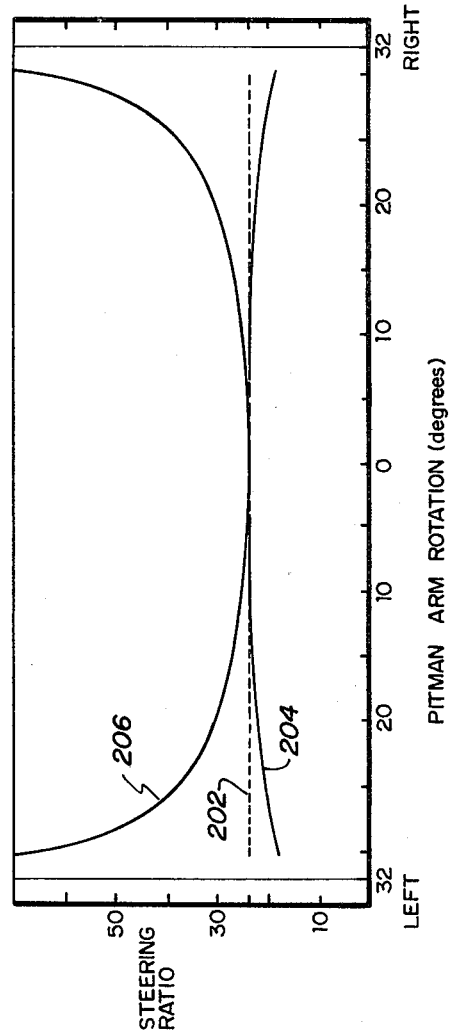
FIG. 13 is a graph of steering ratio versus pitman arm rotation in degrees for several types of actuators.

FIG. 13 is a graphical illustration of steering ratio versus pitman arm rotation for several types of steering actuators. Line 202 represents a screw-type steering gear which remains nearly constant over the full range of pitman arm movement. Line 204 represents the response of a rack and pinion type system. line 206 represents the response of the steering actuator 172 shown in FIG. 12 having a steering ratio at the 0 degree pitman arm position the same as that of the other two systems. The increased mechanical advantage at the extremes of the pivotal range of the actuator 172 is readily apparent.

Figure 16:
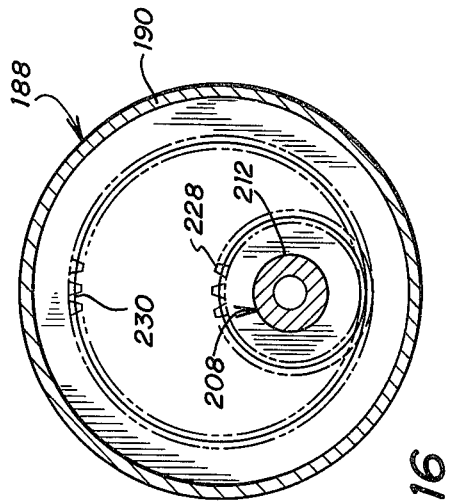
FIG. 16 is a sectional view taken generally along lines 16—16 of FIG. 14 in the direction of the arrows.
Figure 14:
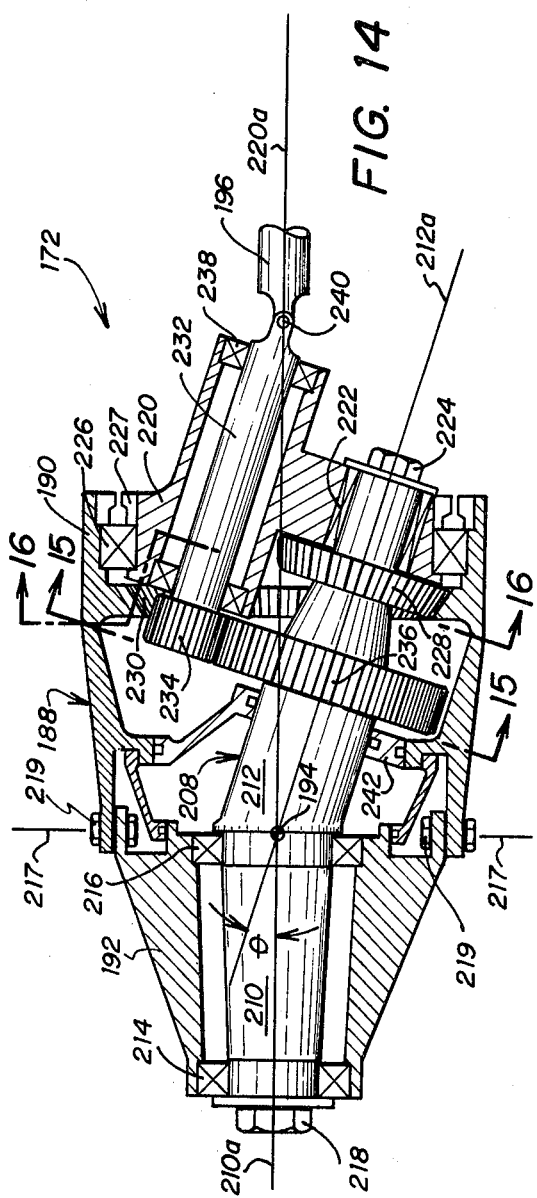
FIG. 14 is a side sectional view with certain parts broken away, of an improved eccentric actuator incorporating a fourth embodiment of the invention.
Figure 15:
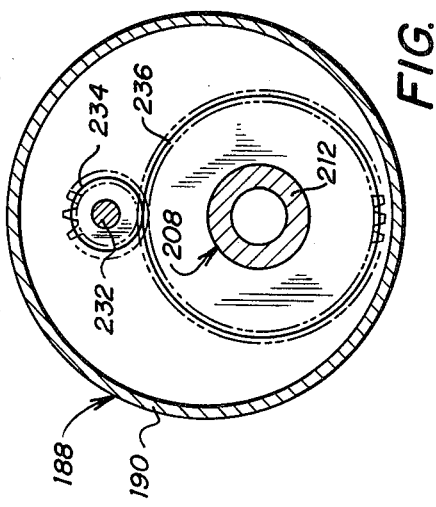
FIG. 15 is a sectional view taken generally along lines 15—15 of FIG. 14 in the direction of the arrows.

The constructional details of the actuator 172 are shown in FIGS. 14, 15 and 16. The actuator 172 includes a bent beam member 208 comprised of a first portion 210 and a second portion 212. The central axis 210a of the first portion 210 is skewed from the second axis 212a of the second portion 212 by an acute angle $\theta$, which is illustrated as approximately 17 degrees.

The first portion 210 of the bent beam member 208 is journaled for rotation within the output housing portion 192 by bearings 214 and 216. The bearings 214 and 216 can comprise bearings of the ball, needle or roller type. A nut 218 is threadedly secured to the reduced and threaded distal end of the first portion 210 to secure the output housing portion 192 onto the bent beam member 208.

The base housing portion 190 and the output housing portion 192 are preferably hinged together for pivotal movement about an axis 217 extending through the pivot axis 194. The two portions of the housing 188 are interconnected by bolts 219 and cooperating nuts.

The second portion 212 of the bent beam member 208 extends into the base housing portion 190 amnd is journaled for rotation within a carrier 220. The distal end of the second beam portion 212 is journaled for rotation within the carrier 220 by a bearing 222, and is secured thereto by a nut 224. The second beam portion 212 is eccentrically supported within carrier 220 at an angle substantially equal to $\theta$. The carrier 220 is supported by a bearing 226 for rotation within the base housing portion 190 about an axis 220a extending through the pivot axis 194 of the bent beam member 208. A seal 227 is provided between the outer ends of carrier 220 and the base housing portion 190.

A set of index gears 228 and 230 interconnects the bent beam member 208 and the carrier 220 with the base housing portion 190. The gear 228 comprises a bevel type gear secured to the second portion 212, while the gear 230 comprises a ring gear grounded to the base housing portion 190. Rotation of the carrier 220 in one direction thus rotates the bent beam member 208 in the opposite direction.

The actuator 172 is driven by a drive shaft 232 secured to a pinion gear 234 which is enmeshed with a drive gear 236 mounted on the second portion 212 of the bent beam member 208. The drive shaft 232 extends through the carrier 220 and is journaled for rotation therein by bearings 236 and 238. The bearings 236 and 238 can comprise roller, ball, needle or other suitable types of bearings, for example.

A universal joint 240, which is preferably located along the axis 220a, couples the outer end of the drive shaft 232 to the steering column 196. A grease seal 242 is preferably provided between the base housing portion 190 and the bent beam member 208 adjacent the drive gear 236.

It will thus be understood that the drive shaft 232 and the pinion gear 234 are supported for rotation with the carrier 220. This arrangement creates a gear reduction greater than the ratio between the gears 234 and 236 because the pinion gear 234 is supported on the rotatable carrier 220 whereby the gears move relative to each other and function like a planetary gear system. Thus, since the pinion gear 234 revolves in a circle, an additional whole number can be added to the ratio between the gears 234 and 236 to arrive at their effective gear ratio. A further gear ratio enhancement of 2:1 is achieved by mounting the pinion gear 234 onto the carrier 220 such that the reaction forces between the gears 234 and 236 also rotates the carrier. The pinion gear 234 thus travels twice as far relative to the drive gear 236 as it would if stationary. The inherent mechanical advantage of the bent beam type actuator in combination with this gear arrangement results in the advantageous steering ratio response depicted by the line 206 in FIG. 13. Aside from these distinctions, the actuator 172 functions similarly to the eccentric actuators 10, 120, and 150 described hereinabove.

Figure 17:
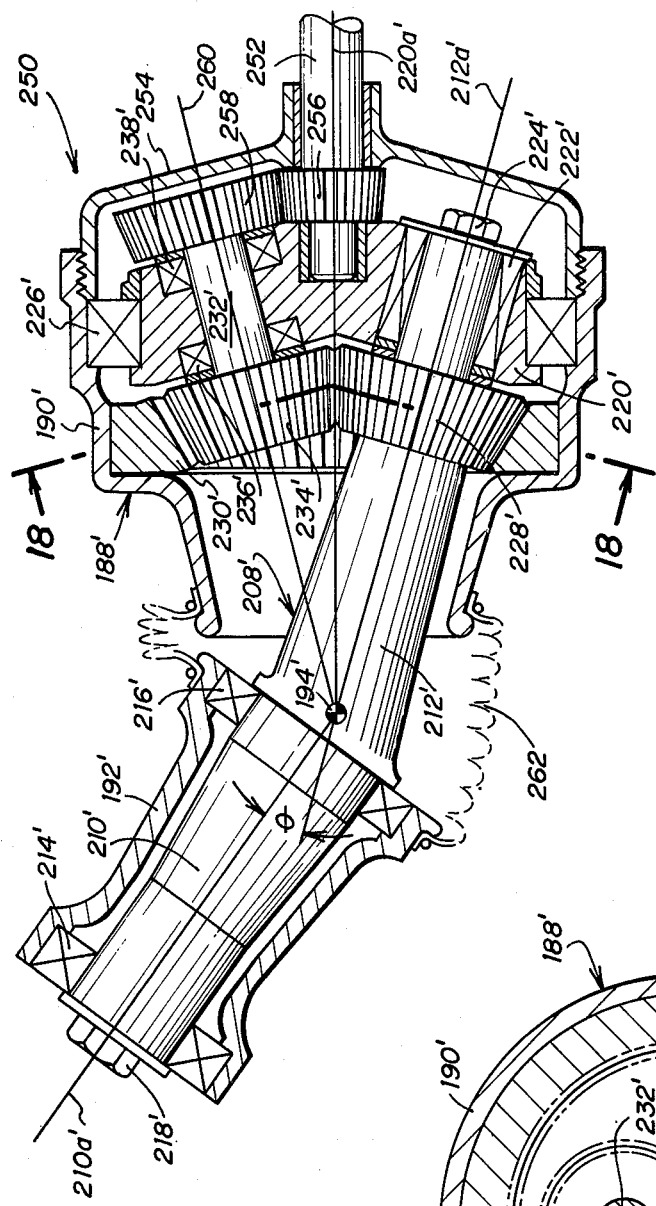
FIG. 17 is a top sectional view, with certain parts broken away, of an improved actuator incorporating a fifth embodiment of the invention.
Figure 18:
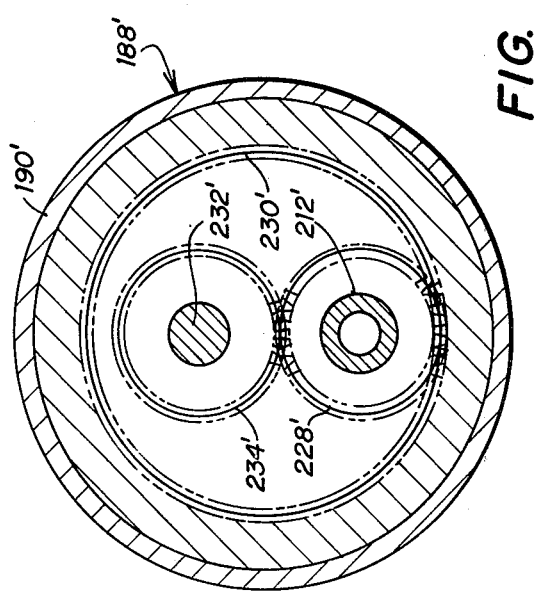
FIG. 18 is a sectional view taken generally along lines 18—18 of FIG. 17 in the direction of the arrows.

FIGS. 17 and 18 illustrate an eccentric actuator 250 constructed in accordance with a fifth embodiment of the invention. The actuator 250 incorporates numerous components which are substantially identical in construction and function to components of the actuator 172 described above. Accordingly, identical reference numerals together with a prime (') notation have been utilized in the description of the actuator 250.

The actuator 250 utilizes a somewhat different gear arrangement requiring one more gear than that of the actuator 172. An input shaft 252 extends through a bushed hole centrally located in a cover 254 which is threaded to one end of the base housing portion 190'. The rotational axis of shaft 252 is coincidental with the axis 220a', and thus extends through the pivot axis 194' of the bent beam member 208'. The inner end of the shaft 252 is received by a corresponding bore in the carrier 220'. Secured to the shaft 252 is a first reduction gear 256 which is enmeshed with a second reduction gear 258 mounted on the drive shaft 232'. The pinion drive gear 234' is mounted on the other end of the drive shaft 232'. The drive shaft 232' is preferably oriented on the carrier 220' such that the common rotational axis 260 of gears 258 and 234' extends through the pivot axis 194' of the bent beam marker 208'.

The gear 234' drives the index gear 228', which is also engaged with the ring gear 230' on the base housing portion 190'. The index gear 228' is thus driven directly by the pinion gear 234' which is supported on the rotatable carrier 220'. The drive gear 234' does not directly engage the ring gear 230'. A protective boot 262 is provided between the portions of the housing 188'. In all other respects, the actuator 250 functions similarly and with the greater mechanical advantage of the actuator 172 described hereinabove.

Figure 19:
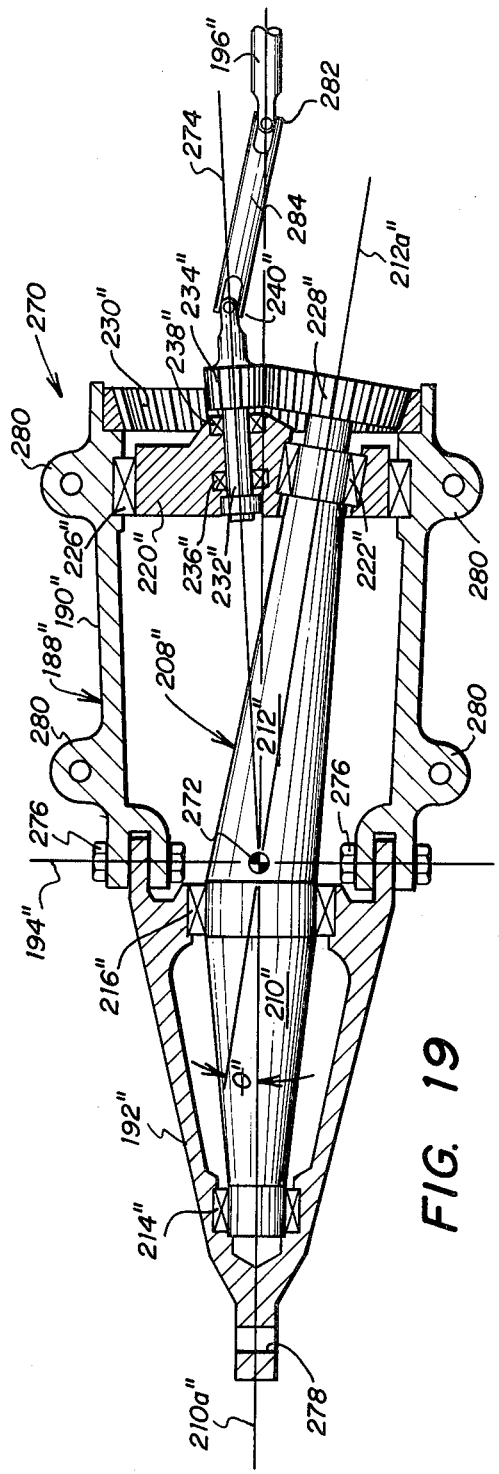
FIG. 19 is a side sectional view of an eccentric actuator incorporating a sixth embodiment of the invention.

FIG. 19 illustrates an eccentric actuator 270 incorporating a fifth embodiment of the invention. The actuator 270 utilizes numerous components that are substantially identical in construction amd function to components of the actuator 172 described above. Accordingly, identical reference numerals together with a double prime (") notation have been utilized in the description of the actuator 270.

The actuator 270 utilizes a gear arrangement requiring one fewer gear than that of the actuator 172. In the actuator 270, the drive gear 234" is mounted on the outside end of the drive shaft 232". The drive gear 234" is engaged directly with the gear 228" of the index gear set. The gear 228", which is secured to the second portion 212" of the bent beam member 208", is enmeshed with the ring gear 230" grounded to the base housing portion 190". The drive shaft 232" and the drive gear 234" are preferably positioned on the carrier 230" such that their common rotational axis 272 extends through the pivot axis 194" of the bent beam member 208". It will thus be apparent that the actuator 270 utilizes a relatively straightforward gear arrangement to drive the carrier 220" in one rotational direction and simultaneously rotate the bent beam member 208" in the opposite direction.

In addition to the foregoing primary distinctions, the actuator 270 includes a housing 188" with a base housing portion 190" hinged to the output housing portion 192" for relative pivotal movement about the axis 194", which extends through the intersection point 272 of the skew axes 210a" and 212a". The two portions of the housing 188" are secured together by bolts 276 and cooperating nuts. A nut, like nut 218 of the actuator 172, is thus unnecessary to constrain the bent beam member 208" against movement relative to the output housing portion 192". An aperture 278 is provided at the end of the output housing portion 192" for connection to the structure to be pivoted. Several lugs 280 are provided on the base housing portion 190" to facilitate mounting of the actuator 270 on suitable ground structure. If desired, a second U joint 282 and a short shaft 284 can be employed to interconnect the steering column 196" with the actuator 270. In all other respects, the actuator 270 functions similarly to and with the same advantages as the actuator 172 described 25 hereinabove.

Figure 20:
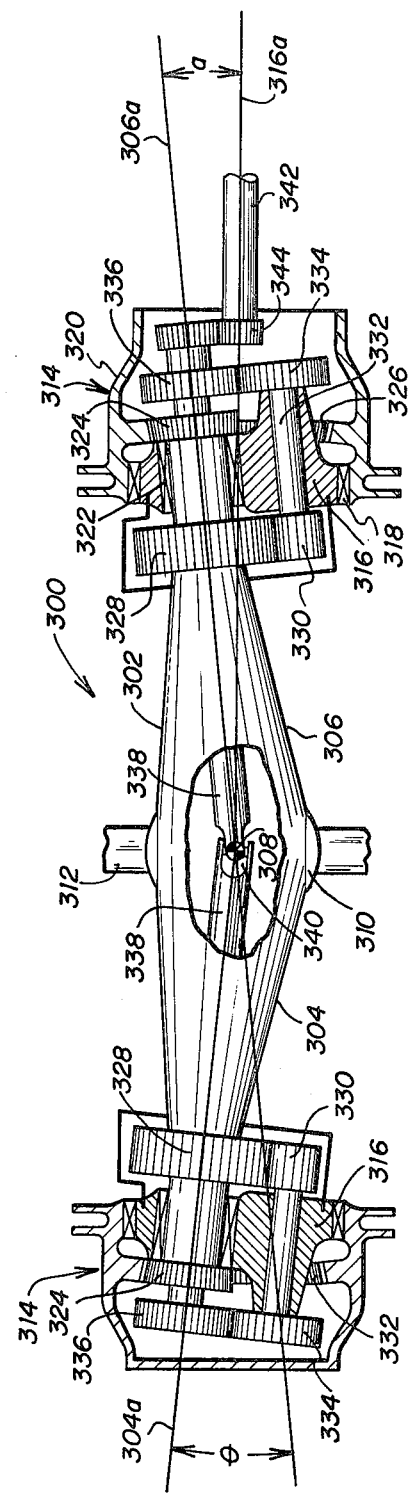
FIG. 20 is a side sectional view, with certain portions broken away, of an eccentric actuator incorporating a seventh embodiment of the invention.

FIG. 20 illustrates an eccentric actuator 300 incorporating a seventh embodiment of the invention. In the actuator 300, each end of the bent beam member 302 is supported for rotation as well as for eccentric revolution. Both ends of the bent beam member 302 are driven in unison, either by common or separate drive means, such that the actuator 300 produces an angular output twice that of an actuator wherein only one end of its bent beam member is supported for rotation and eccentric revolution. in addition, as will be explained more fully below, the actuator 300 requires less total installation space and provides for system redundancy.

The actuator 300 includes a rigid bent beam member 302 having a first portion 304 and a second portion 306. The central axis 304a of the first beam portion 304 is skewed from the central axis 306a of the second beam portion 306 by an acute angle $\theta$ corresponding to the bend angle of the beam member 302. The axes 304a and 306a intersect at a point on the hinge or pivot axis 308.

The bent beam member 302 is supported in a bearing 310 by ground structure 312 for pivotal motion about the axis 308 as well as for rotation. The bearing 310, for example, may comprise a spherical bearing. A plain bearing in a hinged support could also be used.

Each end of the beam member 302 is supported by a housing 314 attached to one of the two structures (not shown) between which relative pivotal movement is desired. Each housing 314 includes a carrier 316 supported by a bearing 318 for rotation within a fixed housing support 320. Each end portion of the bent beam member 302 is supported for rotation within the corresponding carrier 316 by a bearing 322. The central axis 304a or 306a of the corresponding end portion of the bent beam member 302 is offset from the rotational axis 316a of the carrier 316 by an angle alpha. Since both ends of the bent beam member 302 are supported for eccentric revolution, however, the angle alpha is approximately equal to one half the skew angle $\theta$. It will be appreciated that this permits the housings 314 to be more compact.

The actuator 300 incorporates two pairs of index gears 324 and 326. A gear 324 secured to each end of the bent beam member 302 is enmeshed with a ring gear 326 fixed to the housing support 320 of the corresponding housing 314.

A drive gear 328 is also secured to each beam portion 304 and 306. The drive gears 328 are enmeshed with pinion gears 330 mounted on one end of the drive shafts 332 on the carriers 316. Second gears 334 are also mounted on the drive shafts 332. Each second gear 334 is enmeshed with a gear 336 on a half shaft 338 extending inside each of the beam portions 304 and 306. The inner ends of the half shafts 338 are coupled together by a U joint 340 located at the pivot axis 308. It will thus be apparent that both portions of the beam member 302 are mechanically interconnected.

The actuator 300 can be driven through one or both of the housings 314. For purposes of illustration, a single input shaft 342 is shown extending through the housing support 320 of the housing 314 on the right side of FIG. 20. Secured to the input shaft 342 is a pinion gear 344 enmeshed with a gear 346 on the end of shaft 338. The input shaft 342 can be driven by a motor or any other suitable drive means. Aside from the foregoing distinctions, the actuator 300 functions similarly to the inventive embodiments discussed above.

It will be appreciated that both housings 314 can be driven independently, if desired. The half shafts 338 and the U joint 340 would thus be unnecessary. Any of the drive arrangements of the actuators 10, 120, 150, 172, 250, or 270 discussed herein can be employed to drive the actuator 300.

From the foregoing, it will be understood that the present invention comprises an improved actuator of the bent beam type with numerous advantages over the prior art. In some embodiments, the power necessary to effect opposite rotation of the bent beam member and the carrier is generated completely internally to eliminate the power losses and other difficulties associated with the provision of power through an external transmission or gear drive. All of the embodiments herein employ at least one pair of gears for indexing so that the carrier and the bent beam member rotate at opposite but equal rates. Some embodiments incorporate planetary type gear arrangements to drive the bent beam member and carrier with greater mechanical advantage. The most significant advantage of the present invention involves the fact that the power for the improved actuator is and applied directly. Grounding driving gear to the carrier such that the gear tooth forces that drive the beam also drive the carrier in the proper opposite direction reduces the input shaft torque by a factor of two. This action-reaction method of driving the beam with respect to the carrier is common to both the integral, internally driven embodiments as well as the mechanical gear driven embodiments of the invention. Other advantages from the use of the present invention will readily suggest themselves to those skilled in the art.

To summarize, each of the embodiments, an indexing means, incorporating an indexing gear independent of the primary driving gear, is thus employed, and it has been shown that this permits the use of several types of driving means providing the various advantages described. The driving shaft and gear may be conveniently extended rearwardly from the end of the elongated beam rather than laterally toward its side, for example, permitting a more compact and efficient unit. Further, the various drive systems as above described, the use of which is permitted by the indexing means independent of the drive gear, provides the reduction of input shaft torque discussed above.

Although particular embodiments of the invention have been illustrated in the accompanying Drawings and described in the foregoing Detailed Description, it will be understood that the present invention is not limited to the embodiments disclosed but is intended to embrace any alternatives, modifications, rearrangements and/or substitutions of parts or elements as fall within the spirit and scope of the invention.

I claim:

1. An actuator for effecting relative movement between two structures about a pivot axis, comprising:
    an elongate beam with first and second portions having first and second longitudinal axes, respectively, said axes intersecting at the pivot axis and being mutually skewed at a predetermined skew angle;
    said beam being secured at the first portion to the first structure for rotation about the first axis;
    housing means attached to the second structure for supporting the second beam portion for rotation about the second axis and for eccentric revolution about a circle with a centerline intersecting the pivot axis;
    means for effecting rotation of said beam about the second axis; and
    index means, distinct from said means for effecting rotation of said beam about the second axis, for interconnecting the second portion of said beam with said housing means for effecting eccentric revolution of the second beam portion in an opposite direction responsive to rotation of said beam such that the first beam portion pivots about the pivot axis to cause relative movement between the structures.

2. An actuator for effecting relative pivotal movement between first and second structures about a pivot axis, comprising:
    an elongate beam with first and second portions having first and second longitudinal axes, respectively, said axes interesecting at the pivot axis and being mutually skewed at a predetermined skew angle;
    said beam being secured at the first portion to the first structure for rotation about the first axis;
    housing means attached to the second structure for supporting the second beam portion for rotation about the second axis and for eccentric revolution about a circle with a centerline intersecting the pivot axis;
    index means interconnecting said housing means and the second portion of said beam such that eccentric revolution of the second portion of said beam in one direction is accompanied by rotation of said beam in the opposite direction; and
    means including a drive shaft mounted for eccentric revolution in said housing means for simultaneously effecting rotation of said beam about the second axis as well as effecting eccentric revolution of the second portion of the beam to pivot the first beam portion about the pivot axis and cause relative pivotal movement between the first and second structures.

3. The actuator of claim 2, wherein the housing means comprises:
    a support member fixed to the second structure; and
    a carrier member mounted within the support member for rotation about an axis extending through the pivot axis, the second portion of said beam being supported by said carrier member for rotation about the second axis at an eccentric angle substantially equal to the skew angle.

4. The actuator of claim 2, wherein the index means comprises:
    a ring gear fixed to said housing means; and a pinion gear enmeshed with said ring gear and secured to the second portion of said beam for rotation about the second axis.

5. The actuator of claim 2, wherein said drive means comprises:
    a rotatable input shaft mounted for eccentric revolution in said housing means;
    a drive gear secured to said input shaft;
    a first driven gear secured to said drive shaft and enmeshed with said drive gear; and
    a second driven gear secured to the second portion of said beam and enmeshed with said first driven gear.

6. The actuator of claim 2, wherein said drive means comprises:
    a drive gear secured to said drive shaft; and
    a driven gear secured to the second portion of said beam and enmeshed with said drive gear.

7. The actuator of claim 2, wherein said drive means comprises:
    a rotatable input shaft;
    a first drive gear secured to said input shaft;
    a first driven gear secured to said drive shaft and enmeshed with said first drive gear; and
    a second drive gear secured to said drive shaft in operative association with said index means for effecting rotation of said beam about the second axis.

8. The actuator of claim 2, wherein said drive means comprises:
    a drive gear secured to said drive shaft in operative association with said index means for effecting rotation of said beam about the second axis.

9. An actuator for effecting pivotal movement of one structure relative to another structure about a pivot axis, comprising:
    an elongate beam with first and second portions having first and second longitudinal axes, respectively, said axes intersecting at the pivot axis and being mutually skewed at a predetermined skew angle;
    said beam being secured at the first portion to one of said structures for rotation about the first axis;
    housing means for securing the second portion of said beam to the other structure;
    said housing means including a support member fixed to said other structure and a carrier member mounted for rotation with said support member;
    the second portion of said beam being supported in the carrier member of said housing means for rotation about the second axis and for eccentric revolution;
    a rotatable drive shaft supported on the carrier member of said housing means;
    gear means for coupling said drive shaft to said beam; and
    index means for interconnecting said beam with the support member of said housing means such that rotation of said beam in one direction is accompanied by eccentric revolution of the second portion of said beam in the opposite direction whereby the first portion of said beam pivots about the pivot axis to cause relative pivotal movement between the structures.

10. The actuator of claim 9, wherein the second portion of said beam is supported for eccentric revolution by the carrier member of said housing means at an angle approximately equal to the skew angle.

11. The actuator of claim 9, wherein the carrier member of said beam is mounted for rotation about an axis extending through the pivot axis at the intersection of the first and second axes.

12. The actuator of claim 9, wherein the index means comprises:
 a ring gear fixed to said housing means; and
 a pinion gear enmeshed with said ring gear and secured to the second portion of said beam for rotation about the second axis.

13. The actuator of claim 9, wherein said gear means comprises:
 a rotatable input shaft supported for eccentric revolution on the carrier member of said housing means;
 a drive gear secured to said input shaft;
 a first driven gear secured to said drive shaft and enmeshed with said drive gear; and
 a second driven gear secured to the second portion of said beam and enmeshed with said first driven gear.

14. The actuator of claim 9, wherein said gear means comprises:
 a drive gear secured to said drive shaft; and
 a driven gear secured to the second portion of said beam and enmeshed with said drive gear.

15. The actuator of claim 9, wherein said index means includes a gear secured to the second portion of said beam, and wherein said gear means comprises:
 a rotatable input shaft;
 a first drive gear secured to said input shaft;
 a first driven gear secured to said drive shaft; and
 a second driven gear secured to said drive shaft and enmeshed with the gear of said index means.

16. The actuator of claim 9, wherein said index means includes a gear secured to the second portion of said beam, and wherein said gear means comprises:
 a drive gear secured to said drive shaft and enmeshed with the gear of said index means.

17. An actuator for effecting relative pivotal movement between two structures about a pivot axis, comprising:
 an elongate beam with first and second portions having first and second longitudinal axes, respectively, said axes intersecting at the pivot axis and being skewed at a predetermined skew angle;
 first housing means attached to one of said structures for supporting the first portion of said beam for rotation and for eccentric revolution;
 second housing means attached to the other one of said structures for supporting the second portion of said beam for rotation and for eccentric revolution;
 means for effecting rotation of said beam; and
 first and second index means for interconnecting the first and second portions, respectively, of said beam with said first and second housing means, respectively, such that rotation of said beam in one direction is accompanied by eccentric revolution of the corresponding portions of said beam in the opposite corresponding direction whereby the portions of said beam pivot about the axis to effect relative pivotal movement between the structures.

18. The actuator of claim 17, wherein the first and second portions of said beam are mounted for eccentric revolution within the first and second housing means, respectively, at angles approximately equal to one half the skew angle.

19. The actuator of claim 17, wherein each of the first and second housing means each comprises:
 a support member fixed to the corresponding structure; and
 a carrier member mounted in said support member for rotation about an axis extending through the pivot axis.

20. The actuator of claim 17, wherein each of the first and second index means comprises:
 a ring gear fixed to the corresponding housing means; and
 a pinion gear enmeshed with said ring gear and secured to the corresponding portion of said beam.

21. In an apparatus for effecting relative pivotal movement between first and second structures, said apparatus comprising a bent beam with a first portion secured to the first structure for rotation about the axis of the first beam portion, and a second portion secured through a housing to the second structure for rotation about the axis of the second beam portion and for eccentric revolution, the improvement comprising:
 means disposed within said housing for selectively effecting rotation of the bent beam about the axis of the second beam portion; and
 index means interconnecting the second beam portion with the housing for effecting the eccentric circular revolution of the second portion of the beam in an opposite direction at substantially the same rotational rate responsive to the rotation effected in the beam so that one of the portions of the beam is pivoted about the pivot axis.

22. The apparatus of claim 21, wherein said housing includes a carrier member rotatably secured within a support member anchored to the second structure, and wherein the means for effecting rotation of the beam about the axis of the second beam portion comprises:
 structure defining an annular chamber between the carrier member and the second beam portion;
 a first vane attached to the carrier member and extending within the annular chamber in sealing engagement with the second beam portion; and
 a second vane attached to the second beam portion and extending within the annular chamber in sealing engagement with the carrier member;
 said structure defining the annular chamber having input and output ports for connection with a source of fluid to permit fluid biasing of the carrier member and the bent beam in opposite rotational directions.

23. The apparatus of claim 21, wherein said housing includes a carrier member rotatably secured to a support member attached to the second structure, and wherein the means for effecting rotation of the beam comprises:
 a motor having a stator portion mounted on the carrier member and a rotor portion mounted on the second beam portion, said motor being connected to a source of power to effect opposite rotations of the carrier member and the bent beam.

24. The apparatus of claim 21, wherein the index means comprises:
 a ring gear fixed to the housing; and
 a pinion gear enmeshed with the ring gear and secured to the second beam portion for rotation with the beam.

25. An actuator for effecting relative movement between first and second structures connected for pivotal movement about a pivot axis, comprising:
- an elongate beam with first and second portions each having a longitudinal axis, said axes being mutually skewed at a predetermined acute skew angle and intersecting the pivot axis;
- said beam being secured at the first portion to the first structure for rotation about the axis of the first portion;
- housing means attached to the second structure for rotatably supporting the second portion of the beam, said beam being supported for rotation about the axis of the second portion and for eccentric revolution about a circle having a centerline intersecting the pivot axis;
- means disposed within said housing means for effecting rotation of the beam about the axis of the second portion of said beam; and
- index means interconnecting the second portion of said beam with said housing means for effecting the eccentric motion of the second portion of the beam in an opposite direction at substantially the same rotational rate responsive to the rotation of the beam so that one of the portions of the beam is pivoted about the pivot axis to effect relative pivotal movement between the first and second structures.

26. The actuator of claim 25, wherein the housing means comprises:
- a support member affixed to the second structure; and
- a carrier member secured at one end of the support member for rotation relative thereto about an axis extending through the pivot axis, said beam being received through the other end of the carrier and supported therein for rotation about the axis of the second portion of said beam.

27. The actuator of claim 25, wherein the means for effecting rotation of the beam comprises:
- structure defining an annular chamber between the housing means and the second portion of the beam;
- a first vane secured to the housing and extending in sealing engagement with the second portion of the beam and the remainder of the structure defining the annular chamber; and
- a second vane secured to the second portion of the beam and extending in sealing engagement with the housing and the remainder of the structure defining the annular chamber;
- said housing having an input port and an output port connected to source of fluid and opening into the annular chamber on either side of the first vane to permit fluid biasing of the housing and the beam in opposite rotational directions.

28. The actuator of claim 25, wherein the index means comprises:
- a ring gear affixed to the housing means; and
- a pinion gear enmeshed with the ring gear and mounted for rotation with the beam.

29. The actuator of claim 25, wherein the means for effecting rotation of the beam comprises:
- a motor having a stator portion formed on the housing means and a rotor portion formed on the beam, said motor being connected to a source of power to effect relative rotation between said beam and said housing means.

30. The actuator of claim 25, wherein the first and second structures comprise adjacent segments of an airfoil.

31. The actuator of claim 25, wherein the second structure comprises an aircraft wing and the first structure comprises a moveable wing section contiguous with and extending away from the wing.

32. An actuator for connecting first and second structures and for effecting relative pivotal movement between said structures about a pivot axis, comprising:
- an elongate beam with first and second portions each having a longitudinal axis, said axes being mutually skewed at a predetermined acute skew angle and intersecting the pivot axis;
- said beam being secured at the first portion to the first structure for rotation about the axis of the first portion;
- bearing means for rotatably securing the second portion of the beam to the second structure;
- housing means for rotatably securing the distal end of the second portion of the beam to the second structure, said housing means supporting said beam for rotation about the axis of the second portion of the beam and for eccentric revolution about a circle having a centerline intersecting the pivot axis;
- means disposed within said housing means for selectively effecting rotation of the beam about the axis of the second portion of said beam; and
- index means interconnecting the second portion of said beam with said housing means for effecting the eccentric motion of the second beam portion in an opposite direction and at substantially the same rate responsive to the rotation effected in the beam so that one portion of the beam is moved about the pivot axis to effect pivotal actuation between the first and second structures.

33. The actuator of claim 32, wherein the housing means comprises:
- a support member affixed to the second structure; and
- a carrier member secured to one end to the support member for rotation relative thereto about an axis extending through the pivot axis, said beam being received through the other end of the carrier and supported therein for rotation about the axis of the second portion of said beam.

34. The actuator of claim 32, wherein the means for effecting rotation of the beam comprises:
- structure defining an annular chamber between the housing means and the second portion of the beam;
- a first vane secured to the housing and extending in sealing engagement with the second portion of the beam and the remainder of the structure defining the annular chamber; and
- a second vane secured to the second portion of the beam and extending in sealing engagement with the housing and the remainder of the structure defining the annular chamber;
- said housing having an input port and an output port connected to a source of fluid and opening into the annular chamber on either side of the first vane to permit fluid biasing of the housing and the beam in opposite rotational directions.

35. The actuator of claim 32, wherein the index means comprises:
- a ring gear affixed to the housing means; and
- a pinion gear enmeshed with the ring gear and mounted for rotation with the beam.

36. The actuator of claim 32, wherein the means for effecting rotation of the beam comprises:
- a motor having a stator portion formed on the housing means and a rotor portion formed on the beam, said motor being connected to a source of power to effect relative rotation between said beam and said housing means.

37. In combination with an airfoil of the variable camber type having first and second relatively pivotal segments, an improved actuator for effecting relative movement about a pivot axis, which comprises:
- an elongate beam with first and second beam portions each having a longitudinal axis, said axes being mutually skewed at a predetermined acute skew angle and intersecting the pivot axis;
- said first beam portion being secured to the first segment for rotation about the axis of the first beam portion;
- housing means for rotatably securing the second beam portion to the second segment;
- said housing means including a support member affixed to the second segment and a carrier member secured at one end to the support member for rotation relative thereto about an axis extending through the pivot axis, with said second beam portion being rotatably secured to the carrier member at an angle approximately equal to the skew angle so that the second beam portion is mounted for eccentric revolution;
- means disposed within said housing means for effecting rotation of the beam about the axis of the second beam portion; and
- index means interconnecting the second beam portion with the support member of said housing means for effecting rotation of the carrier member in an opposite direction and at substantially the same rate as the rate of rotation effected in the beam so that one portion of the beam is pivoted about the pivot axis to effect relative pivotal movement between the first and second segments of the airfoil.

38. The improved actuator of claim 37, wherein the index means comprises:
- a ring gear affixed to the support member of the housing means; and
- a pinion gear secured to the second beam portion and mounted for rotation therewith in meshed engagement with the ring gear.

39. The improved actuator of claim 37, wherein the means for effecting rotation of the beam comprises:
- a motor with a stator integrated into the carrier member of the housing means and a rotor integrated into the second beam portion, said motor being connected to a source of power to selectively effect relative rotation between the beam and the carrier member.

40. The improved actuator of claim 37, including:
- a vane sleeve mounted for rotation with the second beam portion inside the carrier member of said housing means to define an annular chamber therein;
- said vane sleeve including a first longitudinal vane in sealing contact with the carrier member; and
- a second longitudinal vane mounted for rotation with the carrier member and in sealing contact with the van sleeve; and
- means for introducing fluid into the annular chamber between said first and second vanes to fluidly bias the carrier member and the beam in opposite rotational directions.

41. The improved actuator of claim 40 wherein the second vane is non-integral with the carrier member and comprises a vane member snuggly seated in an associated groove and removably secured to the carrier member at a plurality of longitudinally spaced points.

42. An actuator for effecting relative movement between first and second structures about a pivot axis, comprising:
- an elongate member with first and second portions having first and second longitudinal axes, respectively, said axes intersecting at the pivot axis and being mutually skewed at a predetermined skew angle;
- first means, connecting the member at its first portion to the first structure and permitting revolution of the member first portion relative to the first structure;
- second means, attached to the second structure, for supporting the member at its second portion for rotation about the second axis and for eccentric revolution about a circle with a centerline intersecting the pivot axis; and
- fourth, indexing means, discrete from said third means, interconnecting the second portion of said member with said second means, for effecting eccentric revolution of said member second portion, in response to rotation of said member and in an opposite direction, such that the first portion of said member pivots about the pivot axis to cause relative movement between the structures.

43. The apparatus of claim 42, wherein said elongate member comprises an elongate, tubular member.

* * * * *